Nov. 24, 1936.   A. E. WILKOFF   2,061,687
APPARATUS AND PROCESS FOR PURIFYING OIL
Filed May 18, 1932

INVENTOR.
Arthur E. Wilkoff.
BY
Jesse R. Langley
ATTORNEY.

Patented Nov. 24, 1936

2,061,687

UNITED STATES PATENT OFFICE 2,061,687

APPARATUS AND PROCESS FOR PURIFYING OIL

Arthur E. Wilkoff, Niles, Ohio, assignor, by mesne assignments, to Bocjl Corporation, Pittsburgh, Pa., a corporation of Delaware Application May 18, 1932, Serial No. 612,011

6 Claims. (Cl. 196—16)

My invention relates to oil purifiers and particularly to apparatus for purifying or renovating crank-case oil of motor vehicles.

An object of my invention is to provide an oil purifier that is so simple in construction and operation that it may be used by owners of relatively small numbers of vehicles or owners of small garages at which crank-case oil may be renewed.

A further object of my invention is to provide an oil purifier by means of which the degree of viscosity and the flash and fire temperatures or points of the purified oil may be controlled by the operator.

In general, the oil purifier comprises a tank having a cover to which is secured all of the operating mechanism. The cover and all of the operating mechanism may be easily and conveniently removed as a unit from the tank in order that the contents of the latter may be completely removed.

An important feature is the means for providing a graduated supply of air for treating the oil to control its viscosity, its color and its flash and fire points. This air supply is separate from a supply of air for simply sweeping or carrying vapors of diluents from the tank.

In the accompanying drawing.

Figure 1:
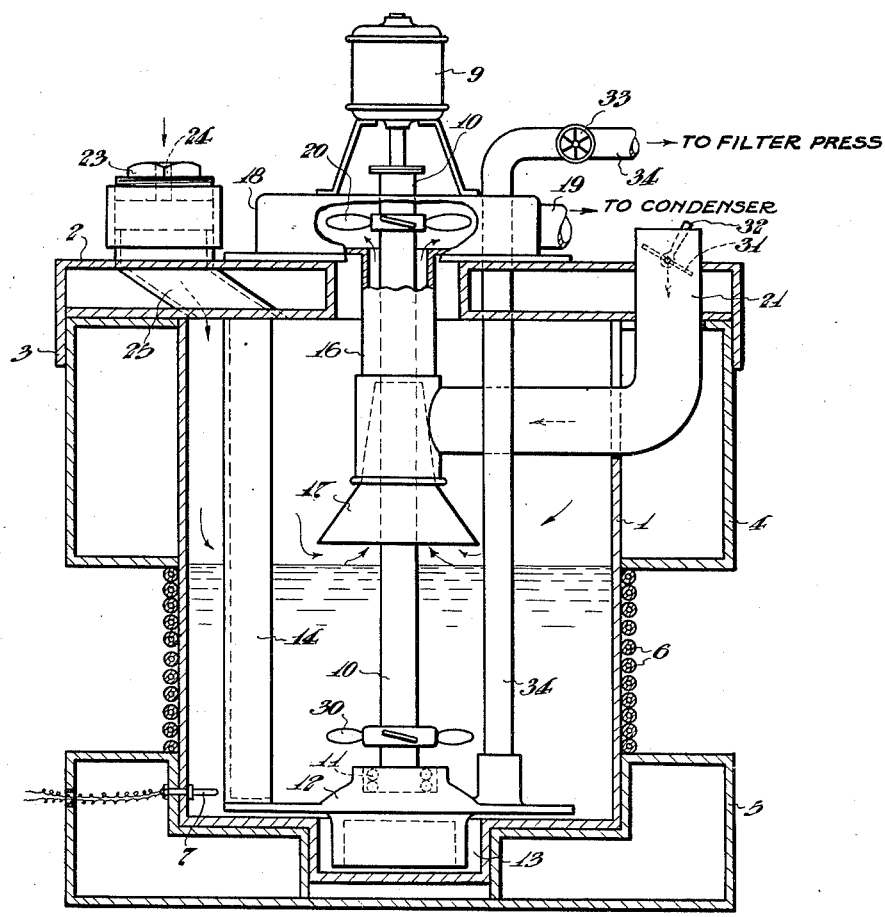
Figure 1 is a vertical sectional view of my improved oil purifier.

Referring to the drawing, the purifier comprises an upright cylindrical tank 1 having a hollow heat-insulating cover 2 with an annular flange 3 and which makes substantially gas-tight engagement with the tank. The tank is surrounded at its top and bottom portions by hollow annular jackets 4 and 5 which provide heat insulation for the tank 1.

Between the hollow jackets 4 and 5 an electric heating element 6 surrounds the tank and is electrically insulated therefrom. Current is supplied to the heating element 6 from any suitable source (not shown). The temperature of the tank is controlled automatically by a suitable thermostat 7 and overheating is thus prevented.

The operating mechanism of the purifier comprises an electric motor 9 mounted on the cover 2 which drives a central vertical shaft 10 having a bearing 11 in the shell of a centrifugal pump 12. The pump 12 which is located in a sump or well 13 in the bottom of the tank is supported by a framework 14 secured to the cover 2.

The shaft 10 is surrounded by a pipe 16 having a flaring or conical bottom portion 17 with its open end slightly above the level of the oil for collecting vapors therefrom. The upper end of the pipe 16 is connected to a drum 18 having an outlet pipe 19 leading to a condenser or other suitable means (not shown) for disposing of the vapors withdrawn from the heated oil. An impeller 20 in the drum 18 and carried by the shaft 10 withdraws through the pipe 16 the vapors from the tank, as well as carrier air admitted to the pipe 16 through a pipe 21 connected to the atmosphere.

Air for contact with the heated oil for controlling its viscosity and its flash and fire points is admitted through a screw plug 23 having a central orifice 24 and through an inclined tube 25 in the cover 2 into the interior of the tank. The amount of air may be varied by substituting another plug having an orifice of different size.

Figure 2:
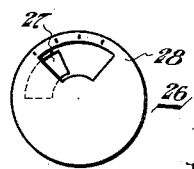
Fig. 2 is a plan view of a modification of a plug for controlling the supply of treating air.

The amount of treating air may also be controlled by a plug 26, Fig. 2, having a variable opening 27 controlled by a movable member 28.

A propeller 30 on the lower portion of the shaft 10 agitates the oil to facilitate the vaporization of gasoline or other diluent and to prevent the deposition of sediment in the bottom of the tank.

In the operation of the purifier, oil to be treated is poured in at the top by inserting a funnel through the opening provided by removing the plug 23. The tank is filled to a desired level, such as that indicated in the drawing. The tank is ordinarily adapted to receive approximately two gallons of oil.

A suitable quantity of clay or fuller's earth or other suitable material is added for the purpose of absorbing tarry constituents of the oil and the screw plug 23 is again inserted. The clay or fuller's earth is preferably added before beginning operations but it may, if desired, be added later.

The tank is then heated by means of the heating element 6 to raise the temperature of the oil to between 350° and 450° F., depending upon the character of the oil being treated and the degree to which the lighter or more volatile constituents or diluents are to be removed. The thermostat 7 is preferably adjustable or designed originally for the maximum temperature desired.

The electric motor 9 and the connected apparatus are in operation during the heating of the oil. The propeller 30 agitates the oil to cause circulation thereof which tends to prevent the deposition of sediment and to keep the fuller's earth or clay in suspension. Also, the circulation of the oil increases the surface exposure of the latter and thereby facilitates the liberation of vapors of the volatile elements.

The impeller 20 at the upper end of the shaft 10 withdraws vapors through the conical bottom portion 17 of the pipe 16 and carrier air is also drawn in through the pipe 21. The pipe 21 is provided with a regulating damper 31 having an operating handle 32. The carrier air and the vapors thus withdrawn are conducted from the drum 18 through a pipe 19 to a suitable condenser (not shown) wherein the condensible vapors may be condensed. The vapors of gasoline or other volatile ingredients or diluents of the oil are thus removed.

While the operation described above is proceeding, air is also admitted through the orifice 24 in the screw plug 23 for contact with the oil as the surface thereof is continually changing by reason of the agitation caused by the propeller 30. It has been found that the viscosity, the color, and the flash and fire points of the resultant product may be controlled by suitably varying the quantity of air that is permitted to contact with the oil during the treating period. This regulation may be secured both by varying the size of the orifice in the screw plug 23 or 26, as the case may be, and by adjusting the damper 31.

When the oil has been sufficiently treated, a valve 33 in a pipe 34 connected to the centrifugal pump 12 is opened and the pump then removes the oil through the pipe 34 to a suitable filter press (not shown), in which all sediment and solid material are removed from the oil.

The resultant product is an oil that is entirely free from volatile constituents such as gasoline or other diluents and all sediment and solid material have been removed therefrom. The oil thus purified and renovated is in condition for the same uses for which it was suitable in its original state. It has been found that the treated oil may have an even higher viscosity and correspondingly greater lubricating qualities than that of the original oil. As stated above, the viscosity, the flash and fire points, and the appearance of the oil with respect to its color may be controlled by varying the amount of air that is permitted to come in contact with the oil during the treating period.

After the treated oil has been withdrawn from the tank, it may be refilled and the operation described above may be repeated as often as desired. If it is desired to completely empty the tank of any material or sediment that may collect, the cover 2 may be removed, whereupon the tank may readily be inverted for this purpose.

The improved purifier of my invention is of simple construction and operates efficiently to remove undesirable ingredients of used crank-case oil or oil employed for similar purposes and to restore it to at least its original state of purity and viscosity. The simplicity of the apparatus enables the latter to be used and operated with entire safety by relatively unskilled labor.

Instead of the screw plug 23 having a fixed orifice and which may be replaced by other screw plugs having orifices of different size, I may use the screw plug illustrated in Fig. 2, in which a variable opening is provided by means of a movable member 28. In the latter construction, a single screw plug is suitable for the various operations and need not be replaced.

The color of the oil is affected by its contact with air and the oxidation resulting therefrom. It is within the scope of my invention to substitute a non-oxidizing gas for air if so desired.

The improved purifier of my invention will enable owners of relatively small garages or of relatively small numbers of automobiles or trucks to effect considerable economy in their operation which has not been possible heretofore because devices of the same general character have been so complicated and expensive in construction that their field has been extremely limited. The initial investment for such devices has been so high that the savings effected by its use must be relatively large. Accordingly, the use of such devices has been limited substantially to the owners or operators of relatively large fleets of trucks or automobiles.

The advantages of the purifier of my invention will be apparent to those skilled in the art of purifying oil and similar materials. The scope of my invention is not to be limited other than as expressed in the claims.

I claim as my invention:

1. A purifier for used lubricating oil comprising a tank for said oil, heating means therefor, means for removing gases from said tank and comprising an elongate tubular member having an open end of approximately conical shape adjacent the level of said oil, and means for admitting air to said tank for contact with said oil before said air is withdrawn through said tubular member to thereby control the viscosity and temperature characteristics of the purified oil.

2. A purifier for used lubricating oil comprising a tank for said oil, heating means therefor, means for removing gases from said tank and comprising a tubular member having an open end of approximately conical shape adjacent the level of said oil, means for admitting carrier air for said gases at an intermediate portion of said tubular member, and means for admitting air to said tank for contact with said oil before said air is withdrawn through said tubular member to thereby control the viscosity of the purified oil.

3. A purifier for used lubricating oil comprising a tank for said oil and a removable unit cooperating with said tank, said unit comprising a cover for said tank, a power-driven shaft carried by said cover, an impeller on said shaft for withdrawing vapor and gases from said tank, and a pump on said shaft for expelling said oil.

4. A purifier for used lubricating oil comprising a tank, a cover therefor, a motor-driven shaft extending into said tank, a pump in the bottom of said tank for expelling oil therefrom and carried by said cover and driven by said shaft, an impeller on said shaft for withdrawing gases and vapor from said tank, said cover being removable and said shaft, pump and impeller being carried by said cover and removable as a unit therewith.

5. A purifier for used lubricating oil comprising a tank for said oil, heating means for said oil for vaporizing diluents therein, means for removing vapors from said tank comprising an impeller and means for supplying air to said impeller as a carrier for vapors without contact with said oil, means for admitting air to said tank for contact with said oil, and separate means for regulating the respective quantities of air thus supplied to said tank.

6. The process of purifying used lubricating oil which comprises heating said oil in a closed container to vaporize the lighter constituents therein, agitating said oil and simultaneously therewith contacting the surface of said oil with a regulable amount of air and continuing said agitation and contacting with air for a period of time to produce purified oil of viscosity up to substantially that of the oil before use.

ARTHUR E. WILKOFF.